United States Patent [19]
Ward

[11] Patent Number: 6,062,735
[45] Date of Patent: May 16, 2000

[54] CORROSION RESISTANT ANTIFRICTION BEARING AND METHOD FOR MAKING SAME

[75] Inventor: Robert E. Ward, Simpsonville, S.C.

[73] Assignee: Reliance Electric Industrial Company, Milwaukee, Wis.

[21] Appl. No.: 09/085,694

[22] Filed: May 27, 1998

[51] Int. Cl.[7] .................................................. F16C 33/62
[52] U.S. Cl. ........................ 384/492; 384/625; 384/913
[58] Field of Search .................................. 384/492, 625, 384/491, 569, 565, 913

[56] References Cited

U.S. PATENT DOCUMENTS

| | | | |
|---|---|---|---|
| 1,755,686 | 4/1930 | De Jahn et al. | |
| 3,212,834 | 10/1965 | Mayer et al. | 308/241 |
| 3,641,990 | 2/1972 | Kinnersly | 123/196 R |
| 3,657,780 | 4/1972 | Stolte | 29/148.4 R |
| 4,293,171 | 10/1981 | Kakumoto et al. | 308/188 |
| 4,309,064 | 1/1982 | Fukuoka et al. | 308/237 R |
| 4,474,861 | 10/1984 | Ecer | 428/614 |
| 4,551,395 | 11/1985 | Lloyd | 428/677 |
| 4,621,700 | 11/1986 | Merkelbach | 180/70.1 |
| 4,641,976 | 2/1987 | Kar | 384/95 |
| 4,645,360 | 2/1987 | Eastwood et al. | 384/129 |
| 4,717,458 | 1/1988 | Martin et al. | 204/44.2 |
| 4,765,871 | 8/1988 | Hsu et al. | 204/44.2 |
| 4,818,632 | 4/1989 | Hsu et al. | 428/613 |
| 4,847,135 | 7/1989 | Braus et al. | 428/138 |
| 4,861,442 | 8/1989 | Nishihama et al. | 204/44.2 |
| 4,908,280 | 3/1990 | Omura et al. | 428/679 |
| 4,946,747 | 8/1990 | Bergmann et al. | 428/653 |
| 4,972,764 | 11/1990 | Ohya et al. | 92/170.1 |
| 4,973,172 | 11/1990 | Nisley et al. | 384/492 |
| 5,028,151 | 7/1991 | Nisley | 384/477 |
| 5,074,040 | 12/1991 | Nisley et al. | 29/898.066 |
| 5,076,115 | 12/1991 | DeWachter et al. | 74/606 R |
| 5,107,589 | 4/1992 | Nisley | 29/898.12 |
| 5,352,046 | 10/1994 | Ward | 384/492 |
| 5,462,381 | 10/1995 | DeWachter et al. | 403/365 |
| 5,670,265 | 9/1997 | Grell et al. | 428/612 |

OTHER PUBLICATIONS

Edward Budman and Robert R. Sizelove, Zinc Alloy Plating, pp. 332–339 (no date).

Reflectalloy® ZNA Zinc–Nickel Alkaline Process–Analytical Procedures, McGean–Rohco, Inc., pp. 1–5, Dec. 1997.

Zinic IZ–260/Zinc–Nickel Alloy Rack Plating Process, Dipsol–Gumm Ventures, pp. 1–5, Nov. 1995.

Reflectalloy® ZNA Zinc–Nickel Alkaline Process–Process Description, McGean–Rohco, Inc., pp. 1–9, 1996.

Reflectalloy® ZNA Zinc–Nickel Alkaline Process–Operating Instructions, McGean–Rohco, Inc., pp. 1–9, 1996.

Philip A. Schweitzer, Corrosion Inhibitors, Corrosion and Corrosion Protection Handbook, Second Edition, pp. 47–51, 1988.

Herbert Brumer, Chromating, 1997 PF Directory, pp. 207–212, 1997.

William P. Innes, Chromate Conversion Coatings, General Processing Data, pp. 390–395 (no date).

*Primary Examiner*—Lenard A. Footland
*Attorney, Agent, or Firm*—Patrick S. Yoder; Alexander M. Gerasimow; John J. Horn

[57] ABSTRACT

A corrosion resistant bearing includes a bearing insert and a housing supporting the bearing insert. The bearing insert includes an outer ring, an inner ring and a plurality of rolling bearing elements disposed between the rings. At least one of the bearing components includes a multi-layer corrosion resistant system for inhibiting or delaying corrosion of the substrate of the component. The substrate may be made of high carbon or alloy steel. The corrosion resistant system includes a galvanic or sacrificial metallic plating layer disposed directly on the component substrate. One or more mechanical protection layers is formed or disposed over the plating layer. A first mechanical protection layer includes a clear chromate coating formed on the plating layer. Additional mechanical protection layers include non-metallic layers, such as acetate or polytetrafluoroethylene coatings. The plating layer and the mechanical protection layers may extend over the bearing ring component raceway, or one or more of the layers may stop short of the raceway. In a method for making the component, a mask may be applied to regions of the component over which one or more the protective layers is not to be applied.

23 Claims, 5 Drawing Sheets

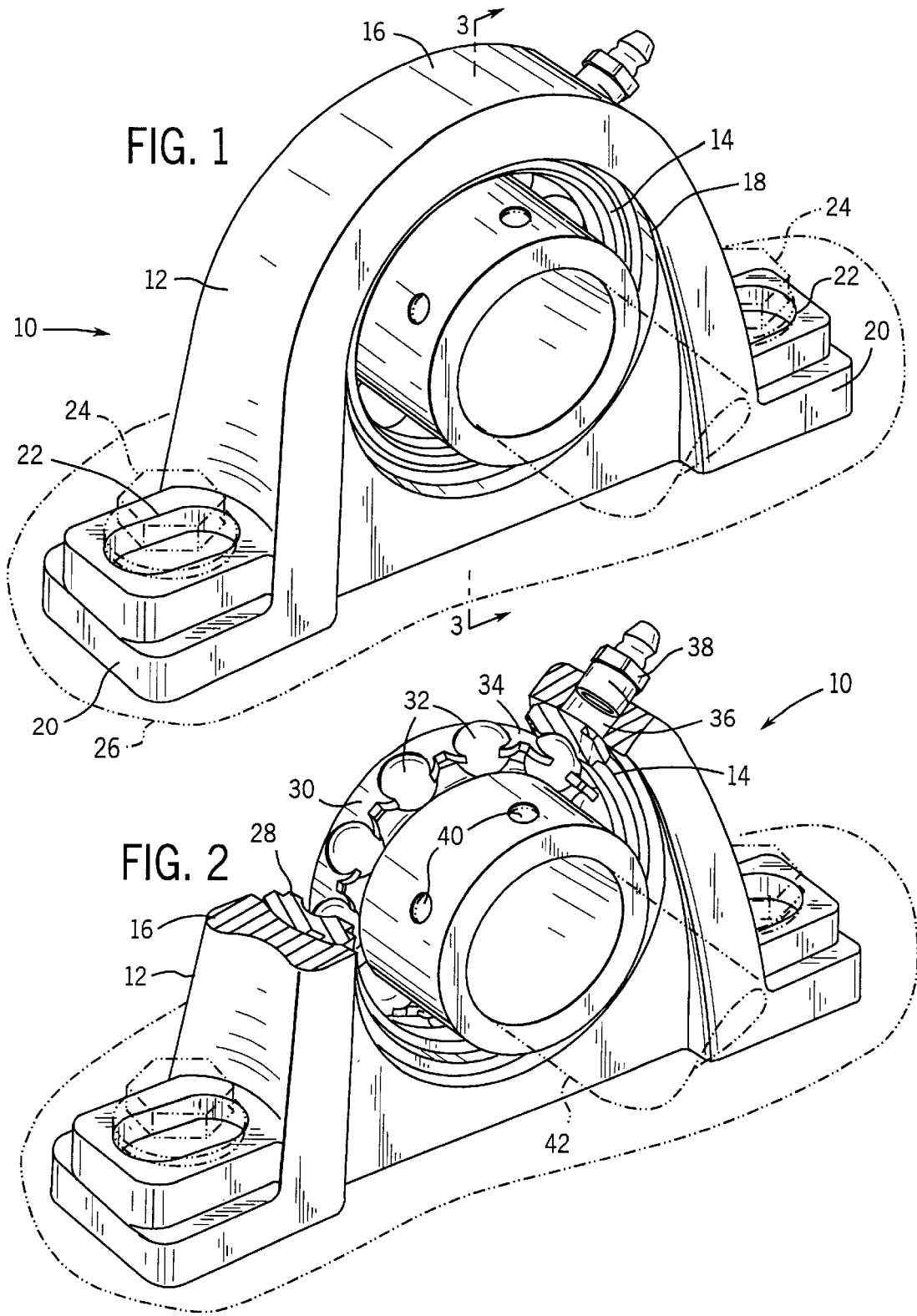

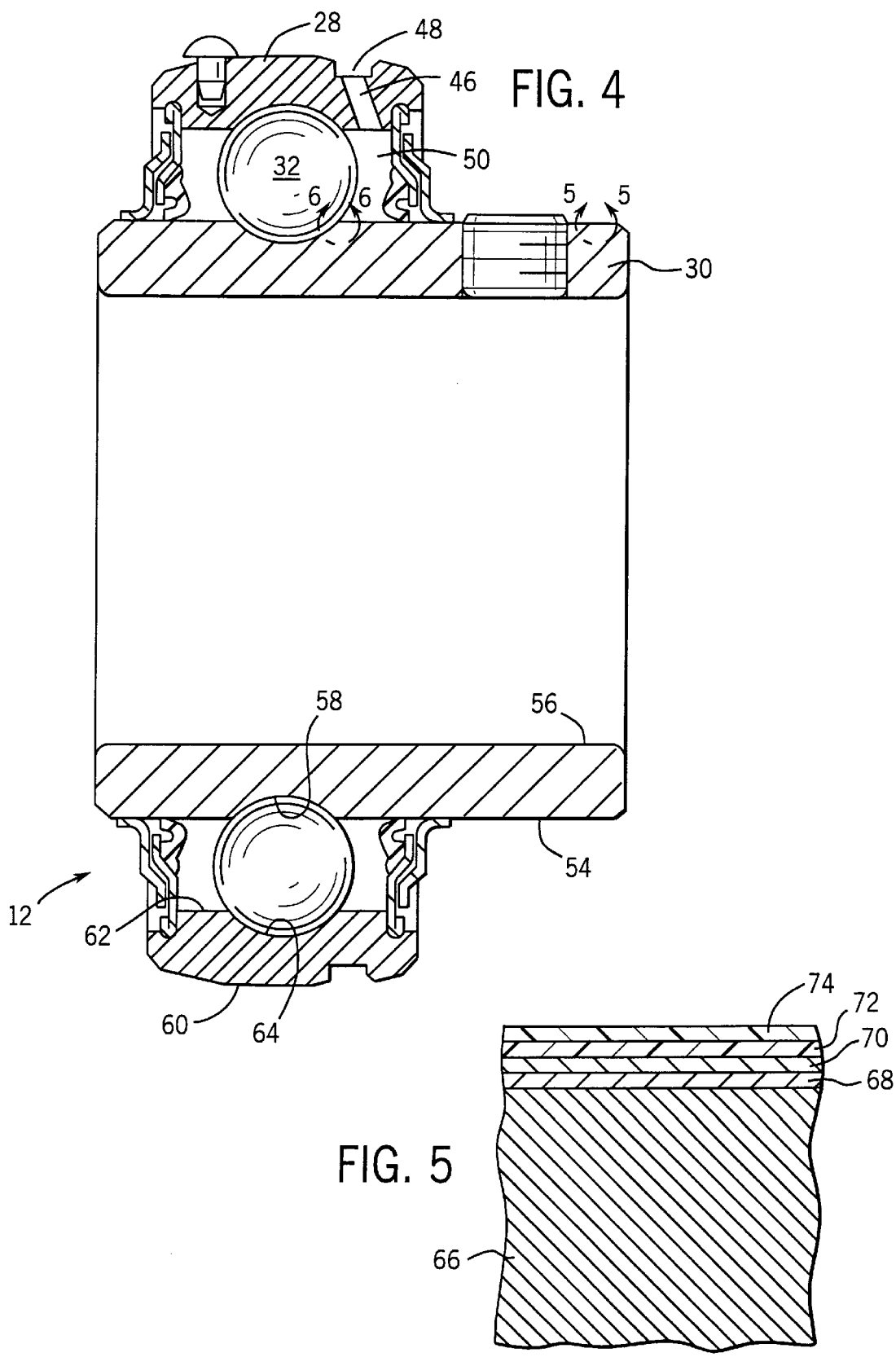

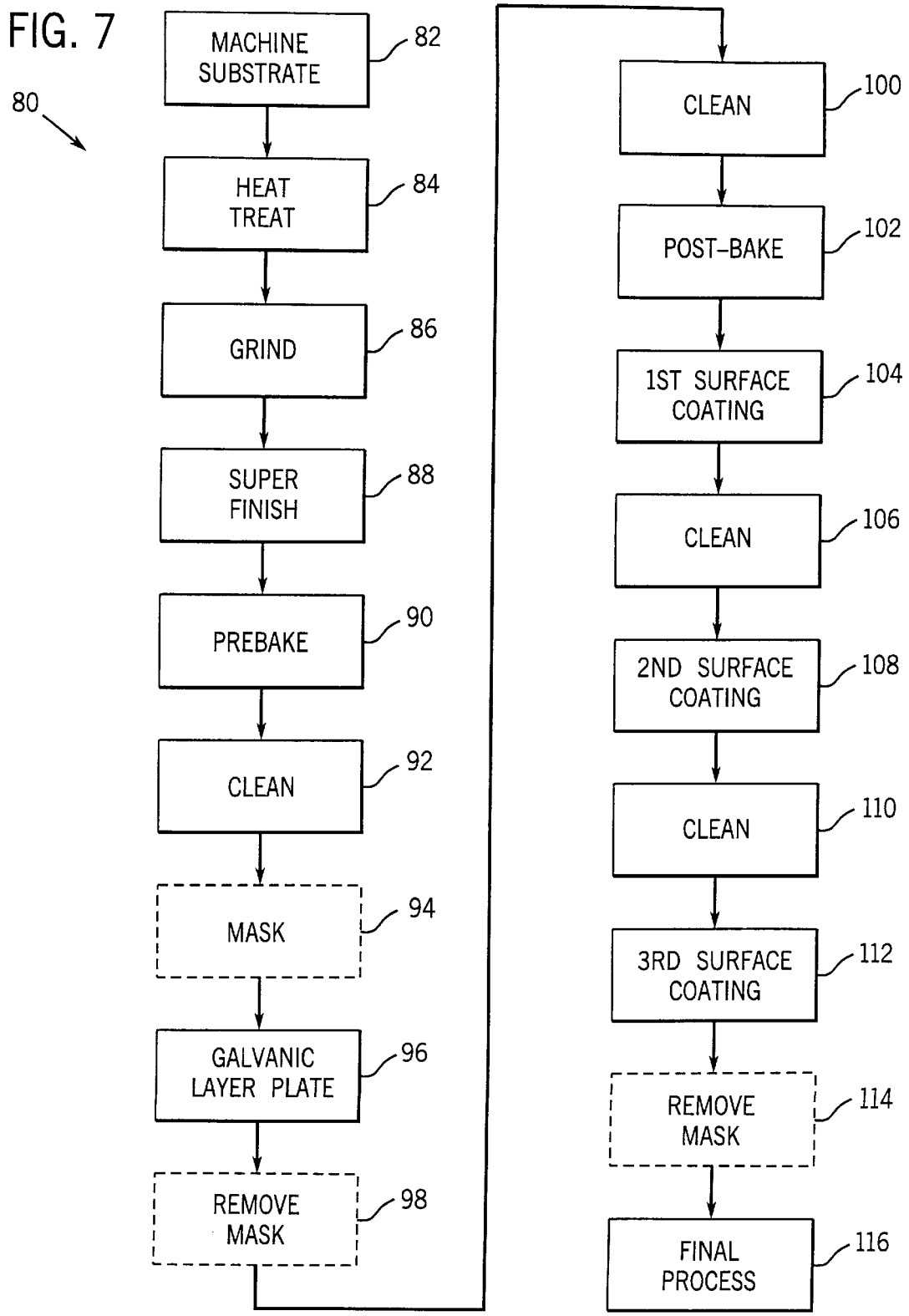

CORROSION RESISTANT ANTIFRICTION BEARING AND METHOD FOR MAKING SAME

BACKGROUND OF THE INVENTION

1. Field of the Invention

The present invention relates generally to the field of antifriction bearings for use in rotating equipment. More particularly, the invention relates to an improved technique for protecting metallic surfaces of antifriction bearings from corrosion, thereby enhancing the useful life of the bearings in a variety of applications and atmospheres.

2. Description of the Related Art

A great number of applications exist for antifriction bearing assemblies in rotating equipment. In general, such bearing assemblies are positioned between rotating and stationary machine elements, and serve to support the rotating machine element on the stationary machine element. Typical industrial applications include shaft bearings, such as in electric motors and pulleys, wheel bearings, such as in roller conveyors and monorails, and so forth. Conventional antifriction bearings generally consist of an inner race, an outer race, and a series of antifriction bearing elements disposed between the inner and outer races. The inner and outer races form hardened raceways on which the bearing elements ride. The bearing elements are free to rotate on the inner and outer races, thereby facilitating rotation of the stationary and rotary elements with respect to one another by virtue of the rolling contact with the bearing races. Such bearing assemblies may include additional components, such as cages, collars, retaining rings, and so forth to facilitate mounting and retention of the bearing in a desired location in the rotating equipment.

Throughout industry, antifriction bearings of the type described above are required to operate reliably in a wide range of environments. In a typical factory environment, components of the surrounding atmosphere may allow conventional materials, such as steel and cast iron to be employed without significant degradation of the bearing components over their useful life. However, in a number of applications, special materials must be provided in the bearing components to avoid accelerated corrosion resulting from the atmosphere within which the bearing operates. For example, in the food and beverage industry, production and transport lines are periodically washed with high pressure steam and water jets, subjecting the bearing components to severe temperature and moisture cycles which can accelerate corrosion of the component surfaces. Similarly, in chemical processing and marine applications, concentrations of corrosive chemicals in the atmosphere surrounding the bearings, such as strong acids, alkalis or salts, can accelerate degradation of the bearing surfaces. In a number of such applications, the corrosion may not only threaten the mechanical integrity of the bearing components, but may end the useful life of the bearing by threatening to contaminate processed goods, such as food and beverage products.

Several approaches have been adopted and are currently in use for protecting bearing components from corrosion. For example, base materials have been used to form bearing components which are less susceptible to corrosive products. Such materials include stainless steel and more exotic metals. Similarly, exposed bearing components have been treated by various plating processes to create corrosion resistant surfaces. Commercially available antifriction bearings of this type include chrome-plated and zinc-nickel plated rings. Depending upon the plating process employed, the plated components may benefit from a simple barrier layer provided between the underlying substrate material and the atmosphere, or may receive additional galvanic protection by virtue of the materials employed in the plating.

While plated bearing products of this type provide enhanced corrosion protection as compared to bare substrate materials used alone, they are not completely satisfactory. For example, certain plating processes are relatively costly considering the cost of the plating material in combination with the labor required for the plating process. Moreover, certain commercially available plating processes may offer mechanical protection without galvanic protection or vice versa. In addition, a large number of applications exist in which visual inspection is the primary means for detecting accelerated bearing corrosion. Accordingly, where the plating provided on the bearing components does not offer a uniform or consistent appearance, or deviates significantly from the appearances of known products, inspection personnel may experience difficulties in evaluating the state of the bearing components. In practice, the appearance of the bearing components is much more than cosmetic, but often forms the basis for evaluating the condition and life of the bearing.

There is a need, therefore, for an improved technique for protecting bearing components from corrosion. In particular, there is a need for a plating or coating for such bearing components which offers both galvanic protection for the underlying substrate material, as well as a mechanical barrier to the surrounding atmosphere. There is currently a significant need for a plated bearing product which offers these advantages over heretofore known bearings, but which conforms in appearance and performance to more conventional materials, such as austenitic stainless steel.

SUMMARY OF THE INVENTION

The invention provides a technique for protecting bearing components from corrosion which is designed to respond to these needs. The invention provides a multi-layer corrosion protection system which may be applied to some or all of the bearing element support surfaces. The protection system may be used on conventional bearing component substrate materials, such as machined or forged high carbon or alloy steel. The system offers both galvanic protection as well as mechanical protective layers, preferably disposed over a galvanic protection layer. The system also permits hydrogen embrittlement relief of the underlying substrate material by appropriately processing the components between application of the protective layers. The system provides a finished appearance which is similar to certain conventional materials, making signs of corrosive degradation easy to recognize by industrial maintenance personnel upon visual inspection. In a preferred arrangement, the final appearance of the plated component is similar to austenitic stainless steel both in a new condition and following a period of use.

Thus, in accordance with a first aspect of the invention, a corrosion resistant antifriction bearing assembly is provided. The assembly includes a housing having a bearing seat for receiving a bearing insert. A bearing insert is disposed in the bearing seat and includes an outer ring, an inner ring and a plurality of antifriction bearing elements disposed between the rings. At least one of the inner and the outer rings is a corrosion resistant ring. The corrosion resistant ring includes a metal substrate, a galvanic protection layer disposed over at least a portion of the metal substrate, and a non-galvanic protective coating disposed over at least a portion of the galvanic protection layer. The galvanic protection layer may comprise of plating alloys, such as porous zinc alloy. The non-galvanic protection layer may include a plurality of layers or coatings, including polymer coatings extending over some or all of the galvanic protection layer. Moreover, the galvanic protection layer and the non-galvanic protection layer may extend over a portion or all of a bearing race which contacts the bearing elements.

In accordance with another aspect of the invention, a bearing is provided including an inner ring, an outer ring and a plurality of bearing elements disposed between the rings. At least one of the inner and outer rings is a corrosion resistant ring. The corrosion resistant ring has a metal substrate at least partially covered by a multi-layer corrosion resistant barrier. The corrosion resistant barrier includes a sacrificial metallic plating layer disposed over the substrate, and at least one mechanical coating layer disposed over at least a portion of the sacrificial metallic plating layer. Where the corrosion resistant ring includes a raceway for receiving and contacting the bearing elements, the sacrificial metallic plating layer may extend at least partially onto the raceway. Similarly, at least one mechanical coating layer may extend at least partially onto the raceway. The mechanical coating layer may also extend onto the raceway even where the sacrificial metallic plating layer is stopped short of the raceway.

In accordance with a further aspect of the invention, a method is provided for making a component of an antifriction bearing. The bearing is of the type including an inner ring, an outer ring and a plurality of rolling bearing elements disposed therebetween. In accordance with the method, a metal substrate for the component is formed, and at least a portion of the component substrate is plated with a sacrificial metallic plating layer to inhibit corrosion of the component substrate. At least a portion of the component is then coated with a mechanical protection layer to limit exposure of the component substrate or the sacrificial metallic plating layer. The sacrificial metallic plating layer may be a metal alloy which is electrolytically applied over at least a portion of the substrate. The method may include additional steps, such as masking portions of the component to prevent either plating or coating. By way of example, the component may include a raceway which is masked to prevent the sacrificial metallic plating layer from extending over the raceway.

BRIEF DESCRIPTION OF THE DRAWINGS

The foregoing and other advantages and features of the invention will become apparent upon reading the following detailed description and upon reference to the drawings in which:

FIG. 1 is a perspective view of a bearing including a bearing set or insert having components protected with corrosion resistant outer layers in accordance with certain aspects of the present technique;

FIG. 2 is a partially cut away perspective view of the bearing of FIG. 1 illustrating the components of the bearing insert and housing;

FIG. 4 is a sectional view of the bearing insert of FIG. 3;

FIG. 5 is a detail sectional view of a portion of the surface of an inner ring of the bearing insert of FIG. 4 illustrating an exemplary multi-layer corrosion resistant system applied to the ring;

FIG. 7 is a flow chart illustrating exemplary steps in the processing of a bearing component for formation of the system for corrosion protection in accordance with the present technique.

DETAILED DESCRIPTION OF SPECIFIC EMBODIMENTS

Figure 3:
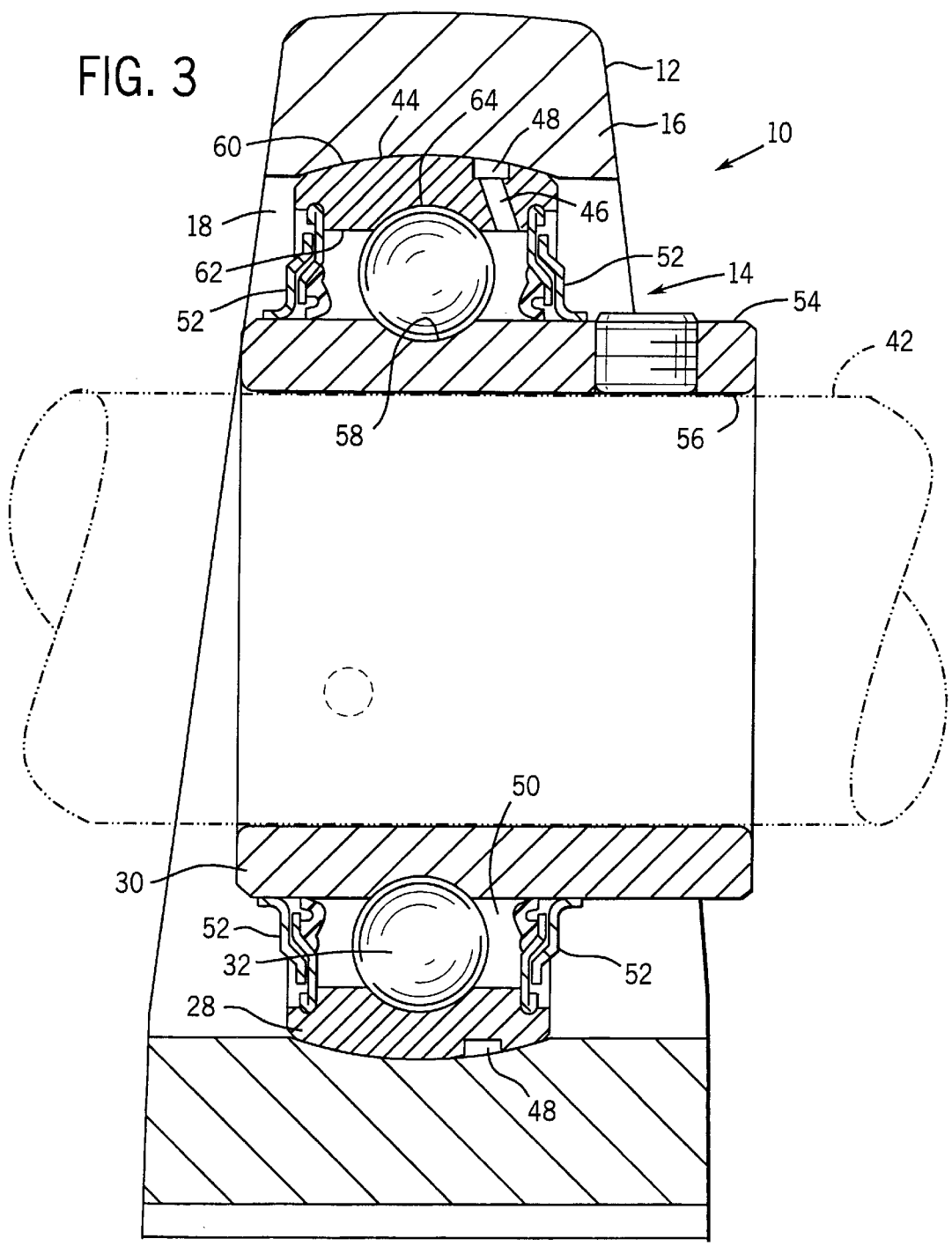
FIG. 3 is a sectional view of a bearing of the type illustrated in FIGS. 1 and 2.

Turning now to the drawings, and referring first to FIGS. 1 and 2, a bearing, designated generally by the reference numeral 10, is illustrated as including a housing 12 and a bearing insert 14 positioned in the housing. In the embodiment illustrated in the Figures, housing 12 is a pillow block style housing, including a central support 16 through which an aperture 18 is formed for receiving bearing insert 14. Attachment flanges or feet 20 extend from central support 16 and include apertures 22 designed to receive fasteners 24 for securing bearing 10 to a support surface 26.

As best illustrated in FIG. 2, the bearing insert shown includes an outer ring 28, an inner ring 30, and a plurality of bearing elements 32 in the form of ball bearings received between the outer and inner rings. The bearing elements may be conveniently positioned in a retainer or cage 34 and are free to rotate within the cage and with respect to the inner and outer rings to provide for free rotation of one ring with respect to another. Also as illustrated in FIG. 2, central support 16 of housing 12 includes a lubricant passage 36 in which a lubricant fitting 38 is positioned. As described more fully below, lubricant fitting 38 permits lubricant, such as grease, to be pumped into the region between outer and inner rings 28 and 30 via passage 36, thereby providing lubrication for the bearing components, and inhibiting the ingress of dirt and contamination into the operational region of the bearing elements. Also as shown in FIG. 2, inner ring 30 may include one or more threaded apertures 40 for receiving set screws or similar fasteners used to properly position a shaft 42 in bearing 10.

As will be appreciated by those skilled in the art, the present technique for preventing or inhibiting corrosion of bearing components may be applied to various styles and configurations of bearings. For example, while the pillow block style bearing housing is illustrated in the Figures, the present technique may be applied to bearing housings in two or four-bolt flanged bearing housings, tapped-base housings, and so forth. Similarly, the present technique may be applied to a variety of designs of bearing inserts. Thus, while ball bearings are illustrated in the Figures, the technique may be equally well applied to bearing assemblies including needle bearings, roller bearings, tapered roller bearings, thrust bearings, journal bearings, and so forth.

FIG. 3 illustrates the bearing of FIGS. 1 and 2 in vertical section. As shown in FIG. 3, housing 12 preferably forms a spherical bearing seat 44 surrounding aperture 18. Bearing insert 14 is received within and supported by this spherical bearing seat. A lubricant passage 46 may be formed in outer ring 28, in fluid communication with an annular groove 48 formed in the outer ring to permit lubricant to be transmitted from the annular lubricant groove into an interior cavity 50 formed between outer ring 28 and inner ring 30 in which bearing elements 32 are positioned. Moreover, seal assemblies 52 are provided between outer ring 28 and inner ring 30 to maintain lubricant thus injected into cavity 50, and to prevent the ingress of contaminants, water, and so forth, into the cavity.

In accordance with the present technique, one or more of the bearing components is provided with protective corrosion resistant layers to form a corrosion resistant system. Such layers may be provided on surfaces of outer ring 28, inner ring 30, or on additional components included in the bearing insert or housing. In the illustrated embodiment, for example, inner ring 30 includes an outer surface 54, an inner surface 56, and forms, along outer surface 54, an inner race 58. As best shown in FIGS. 3 and 4, inner race 58 is designed to receive and bear against bearing components 32 positioned between the inner and outer rings. Similarly, outer ring 28 includes an outer surface 60, an inner surface 62, and an outer race 64 formed as an annular groove within inner surface 62. The corrosion resistant system may extend over any or all of surfaces 54, 56, 58, 60, 62 and 64, as well as over additional surfaces between these surfaces, or over surfaces of housing 12, where desired. In the following discussion, however, reference is made to specific regions of the inner ring 30 for the sake of simplicity. These regions are best illustrated in FIG. 4. A first such region, denoted 5—5 in FIG. 4, lies on an outer or distal portion of outer surface 54 of inner ring 30. A second region, denoted 6—6 in FIG. 4, lies partially on outer surface 54 of inner ring 30, and encompasses a portion of inner race 58.

Referring first to the region denoted 5—5 in FIG. 4, the corrosion resistant system in such regions preferably includes a plurality of corrosion inhibiting layers, including a galvanic or sacrificial plating layer, and a multi-layer mechanical protective structure, as illustrated in FIG. 5. In particular, in accordance with a presently preferred embodiment, the bearing component, such as inner ring 30, comprises a metallic substrate 66 which may be made of any suitable material, such as steel. To protect and inhibit corrosion of the surface of the substrate 66, a galvanic or sacrificial metallic plating layer 68 is formed over at least a portion of the substrate. Both the metallic substrate 66 and plating layer 68 are, in turn, protected by one or more barriers comprising the mechanical protective structure, thereby inhibiting exposure of the substrate and plating layer to corrosive elements and protecting the substrate and plating layer from mechanical damage such as scratching and wear. The outer protective layers also preferably provide an aesthetically desirable finish appearance in the final product and facilitate inspection by maintenance personnel for signs of corrosion.

Plating layer 68 may comprise any suitable sacrificial material, and preferably comprises a zinc alloy-based plating applied to substrate 66 via an electrolytic process as described more fully below. As will be appreciated by those skilled in the art, corrosive components in the environment in which the bearing operates will tend to corrode (e.g., oxidize) layer 68 preferentially before attacking substrate 66. In a presently preferred embodiment, plating layer 68 is formed on the substrate after heat treating and grinding, and comprises a 0.0003 inch electrolytic deposition of zinc alloy including from 12 to 14 percent nickel. While any suitable application method may be used, a presently preferred method is available commercially under the designation Reflectalloy ZNA from McGean-Rohco, Inc. of Cleveland, Ohio. The process employed is preferably a zinc-nickel alkaline bath process. However, in specific applications, alternative processes may include acid baths, as well as alternative chemistries based upon other galvanic or sacrificial metals.

In a presently preferred embodiment, a multi-layer mechanical coating system is also employed as illustrated in FIG. 5. In particular, a first layer 70 is applied directly over at least a portion of plating layer 68. This first layer is preferably a clear chromate conversion coating. Suitable coatings have been found to include a commercially available chromate conversion coating available from McGean-Rohco, Inc. under the commercial designation Rodip. As will be appreciated by those skilled in the art, such chromate conversion coatings may be applied directly to a zinc alloy deposit layer such as plating layer 68.

In addition to layer 70, at least one additional mechanical protective layer is preferably provided over the sacrificial or galvanic plating layer 68. In the embodiment of FIG. 5, two such layers are applied. Layers 72 and 74 are preferably coatings applied over the chromate conversion coating 70. While layers 72 and 74 may be different from one another, in a presently preferred embodiment, both layers 72 and 74 are clear, non-metallic coatings applied by dipping the component in a coating material bath. Presently preferred coatings include acetate coatings, and tetrafluorethylene film coatings applied to an approximate thickness of 0.000020 to 0.000200 inches. Suitable coatings have been found to include a commercially available organic coating under the designation Rodip Supreme Seal 500 and a polytetrafluoroethylene designated RO-59 available from the RO-59 Corp. Moreover, one or both of coating layers 72 and 74 may be colored to provide a desired surface finish, or may be clear colorless coatings providing a polished surface finish by virtue of the underlying chromate coating 70.

It has been found that the combination of galvanic or sacrificial metallic plating layer 68 with one or more mechanical protection layers, preferably a system of several such layers, provides superior surface appearance as well as inhibits or delays corrosion of substrate 66 in corrosive environments. In particular, it has been found that the corrosion resistant system defined by the combined sacrificial and mechanical protection layers provides a finished bearing component which can undergo successive wash downs, exposure to strong oxidants, temperature cycles, and so forth, while delaying surface corrosion significantly as compared to existing bearings having mechanical or galvanic protective coatings alone.

Figure 6A:
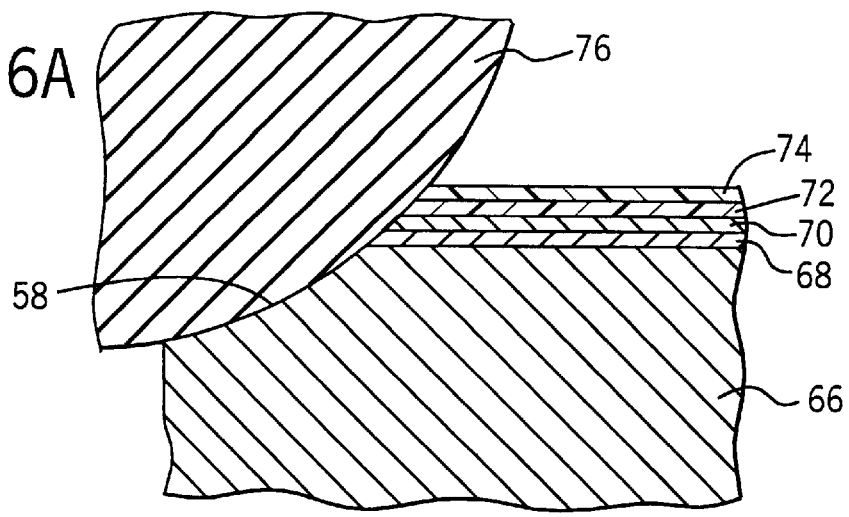
FIGS. 6A–6C are detail sectional views of a portion of a bearing race and outer surface of the inner ring of the bearing insert of FIG. 4 illustrating alternative manners for extending the corrosion resistant system in the vicinity of the bearing race.
Figure 6B:
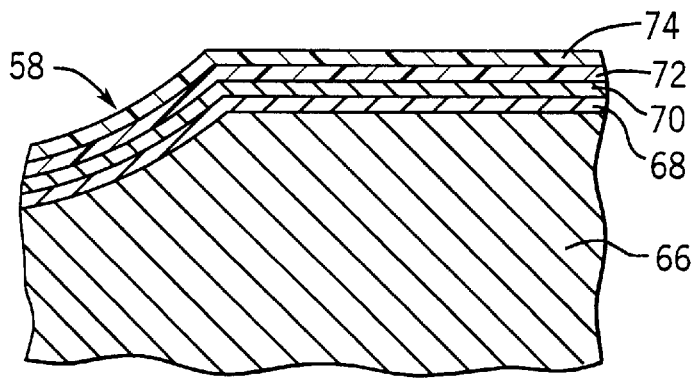
Figure 6C:
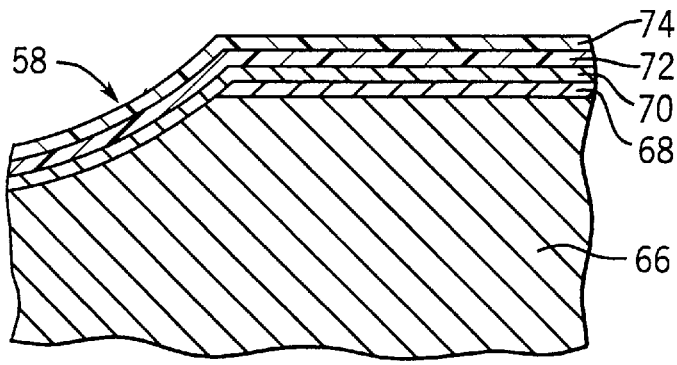

FIGS. 6A, 6B and 6C illustrate several preferred manners in which regions adjacent to and including raceways, such as inner raceway 58 may be configured. As described above, the corrosion resistant system is applied over substrate 66 and includes a sacrificial or galvanic protection layer 68, and a series of mechanical protection layers 70, 72 and 74. As shown in FIG. 6A, all of these layers may be prevented from extending over raceway 58 by appropriately masking the raceway during processing. FIG. 6A represents a presently preferred manner for such masking, employing an elastomeric masking member 76 to seal raceway 58 during plating and coating. In a presently preferred embodiment, an elastomeric (e.g., polyurethane) component 76 in the form of an annular ring is tightly positioned in raceway 58 after grinding of the raceway. The inherent elasticity of member 76 prevents penetration of the plating and coating layers into the raceway. Following plating and coating, the member is removed to expose the hardened substrate 66 in the region to be occupied by the bearing elements 32 (see e.g., FIG. 4) in use. A similar elastomeric mask member may be employed to mask outer raceway 64 of outer ring 28 (see e.g. FIG. 4). Thus, where desired, all of the corrosion resistant layers and coatings may be prevented from extending over the raceway, thereby providing direct contact between the bearing elements and the substrate material. As will be appreciated by those skilled in the art, various alternative approaches may be envisaged for masking the raceways of the bearing components. For example, coatings or paints may be applied to the raceways which effectively prevent some or all of the corrosion resistant layers from directly contacting substrate 66. Such coatings or paints can be subsequently removed after application of the corrosion resistant system. Moreover, some or all of the corrosion resistant system may be applied to the entire bearing component, and the raceway subsequently machined or ground to remove them from the underlying substrate 66.

FIG. 6B illustrates an alternative configuration of the corrosion resistant system wherein all of the layers in the system extend over the bearing raceway. In this configuration, no mask element or mask coating is employed during the plating and coating processes. As illustrated in FIG. 6C, some or all of the mechanical coating layers may extend over at least a portion of the raceway, while the underlying galvanic or sacrificial plating layer stops short of the raceway. In certain applications, and depending upon the composition of layer 68, this alternative configuration may provide for a greater fatigue life and a more wear resistant raceway, while providing the corrosion resistance desired over the outer surfaces of the substrate. As will be appreciated by those skilled in the art, various alternative arrangements based upon the system illustrated in FIG. 6C may also be envisaged. For example, chromate conversion coating 70 may also stop short of raceway 58, by applying a mask such as mask 76 in FIG. 6A, to the raceway during application of the plating layer 68 and chromate conversion layer 70, and by removing the mask during application of the outer coating layers.

FIG. 7 illustrates steps in a presently preferred manufacturing process for forming a corrosion resistant bearing component of the type described above. This process, designated generally by the reference numeral 80, begins at step 82 wherein the substrate for the component is formed. This substrate is typically machined in generally known machining processes, such as turning operations performed on soft steel slugs or forgings to create the desired bearing ring geometry and features, including raceways, where desired. At step 84, the substrate is heat treated to harden the substrate material. At step 86 the hardened substrate is ground to provide the tolerances desired in specific regions of the substrate, particularly in raceways. Similarly, at step 88 the substrate is superfinished to further improve the surface finish within specified regions, preferably within the raceways.

Once the basic geometry of the component substrate has been defined, a series of steps are performed prior to the plating. In particular, as indicated at step 90, the substrate is preferably prebaked to relieve stresses prior to plating. As will be appreciated by those skilled in the art, this prebake step will be performed at a temperature and for a duration as required by the substrate material and its geometric configuration. In a presently preferred embodiment, the prebake step is performed at 350° F. for 2.5 hours. At step 92, the substrate is cleaned, such as by dipping in a cleaning solution and wet blasting the cleaned components. This cleaning operation effectively removes debris and fluids from the substrate surface, exposing the surface for application of the plating layer. At step 94, a mask is applied where desired. In particular, in a presently preferred embodiment components including raceways may be masked to prevent plating of the raceways. This mask may be applied in several manners, as described above with reference to FIG. 6A. Where the plating layer is desired to extend over the component raceway, step 94 may be eliminated. In specific applications, however, it has been found that excluding plating from the raceway surfaces may be useful in maximizing bearing life and reducing noise during operation. At step 96, the galvanic or sacrificial plating layer 68 is applied. In the presently preferred embodiment this layer is a zinc-nickel alloy plating applied by co-deposition of metal to a thickness of approximately 0.0003 inches and within a tolerance of +/−0.0001 inches. The resulting component preferably achieves a surface appearance approximately equivalent to a series 300 stainless steel.

After plating, process 80 proceeds with sequential steps for applying the mechanical protection layers over the plating layer as follows. At step 98, the mask applied at step 94 is removed. Step 98 is particularly useful where a mask is employed that would be damaged by subsequent cleaning and post baking operations. However, especially where alternative mask techniques are employed, such as masking with paints or coatings, this step may be delayed until later in the manufacturing process. Moreover, where the mask is removed at step 98, the mask may be reapplied at a subsequent point in the process, such as following post baking, to prevent subsequent layers in the corrosion resistant system from being applied to raceways and other regions of the component. At step 100, the plated substrate is cleaned, rinsed and dried to neutralize and remove plating residue. At step 102 the plated component is post baked to relieve hydrogen embrittlement. The particular temperature and duration of this post baking process may vary depending upon the type and thickness of the plating layer applied at step 96. However, in a presently preferred embodiment a post baking operation is performed at 375° F. for a duration of 4 hours.

Beginning at step 104, the mechanical protection layers are applied over the plating layer deposited at step 96. In particular, at step 104 a first surface coating in the form of a clear chromate conversion coating is formed on plating layer 68. As mentioned above, while any suitable technique may be employed for application of the chromate conversion coating, a convenient method employs dipping the plated component in an acid bath. As will be appreciated by those skilled in the art, the application of this chromate conversion coating enhances corrosion resistance and improves the outer appearance of the component. At step 106 the coated component is cleaned, rinsed and dried to neutralize the chemicals applied at step 104 and to remove surface residue. At step 108 a second surface coating is applied, preferably in the form of a clear acetate or polytetrafluoroethylene dip. This second coating is applied directly over the clear chromate coating and further improves corrosion resistance as well as resistance to light scratching, wear and staining during use. At step 110 the coated component is again cleaned, rinsed and dried to neutralize and remove residue from the surface. At step 112, a third surface coating is applied. This third surface coating may be identical to the second surface coating, such as a clear acetate or polytetrafluoroethylene dip coating. Alternatively, the coating applied at step 112 may be different from the second coating applied at step 108, such as to provide a desired surface color finish facilitating visual inspection by operations personnel.

Following application of the mechanical protection layers, the mask applied at step 94 may be removed at step 114. As discussed above, where the alternative configurations of FIGS. 6A, 6B or 6C have been obtained by application of a mask at other points during the foregoing process, step 114 may be unnecessary. At step 116, the component is final processed. This final processing may include grinding or superfinishing in regions of the component to be removed after plating and coating. However, in a presently preferred embodiment of the process, the final processing at 116 involves the final assembly of the components in the bearing insert and bearing housing described above.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A corrosion resistant antifriction bearing assembly comprising:

a housing having a bearing seat for receiving a bearing insert; and a bearing insert disposed in the bearing seat, the bearing insert including an outer ring, an inner ring and a plurality of antifriction bearing elements disposed between the outer ring and the inner ring;

wherein at least one of the inner ring and the outer ring is a corrosion resistant ring, the corrosion resistant ring including a metal substrate, a galvanic protection layer disposed over at least a portion of the metal substrate, and a non-galvanic protective coating disposed over at least a portion of the galvanic protection layer; the galvanic protection layer including a porous zinc alloy plated to the portion of the metal substrate.

2. The bearing assembly of claim 1, wherein the galvanic protection layer has a thickness of approximately 0.0003 inches and a nickel content of approximately 12 to 14%.

3. The bearing assembly of claim 1, wherein the corrosion resistant ring includes a bearing race configured to contact the plurality of bearing elements, and wherein the galvanic protection layer does not extend over any portion of the bearing race, and wherein the non-galvanic protective coating extends over at least a portion of the bearing race.

4. The bearing assembly of claim 1, wherein the corrosion resistant ring includes a bearing race configured to contact the plurality of bearing elements, and wherein the galvanic protection layer extends over at least a portion of the bearing race.

5. The bearing assembly of claim 4, wherein the non-galvanic protective coating extends over at least a portion of the bearing race.

6. The bearing assembly of claim 1, wherein the non-galvanic protective coating includes at least one polymer coating layer resistant to corrosion and chemical attack.

7. The bearing of claim 6, wherein the mechanical coating layer includes a plurality of dissimilar coating layers disposed over the sacrificial metallic layer.

8. The bearing assembly of claim 6, wherein the at least one polymer coating layer comprises essentially a fluorocarbon polymer.

9. The bearing assembly of claim 6, wherein the non-galvanic protection layer further includes a clear chromate coating disposed between the galvanic protection layer and at least one polymer coating layer.

10. A corrosion resistant bearing comprising:

an inner ring;

an outer ring; and a plurality of bearing elements disposed between the inner and outer rings to permit free rotation of the inner or outer rings with respect to one another;

wherein at least one of the inner and outer rings is a corrosion resistant ring including a metal substrate at least partially covered by a multi-layer corrosion resistant barrier, the corrosion resistant barrier including a sacrificial metallic plating layer disposed over the substrate and at least one mechanical coating layer disposed over at least a portion of the sacrificial metallic plating layer; wherein the sacrificial metallic plating layer includes a porous zinc alloy plated to the portion of the metal substrate.

11. The bearing of claim 10, wherein the corrosion resistant ring includes a raceway for receiving and contacting the bearing elements, and wherein the sacrificial metallic plating layer extends at least partially onto the raceway.

12. The bearing of claim 11, wherein the at least one mechanical coating layer extends at least partially onto the raceway.

13. The bearing of claim 10, wherein the corrosion resistant ring includes a raceway for receiving and contacting the bearing elements, and wherein the sacrificial metallic plating layer does not extend over any portion of the raceway, and wherein at least one mechanical coating layer extends over at least a portion of the raceway.

14. The bearing of claim 13, wherein the at least one mechanical coating layer includes a plurality of coating layers, and wherein at least one of the coating layers does not extend over any portion of the raceway.

15. The bearing of claim 10, wherein the sacrificial metallic plating layer has a thickness of approximately 0.0003 inches and a nickel content of approximately 12 to 14%.

16. The bearing of claim 10, wherein the mechanical coating layer includes at least one polymer coating layer resistant to corrosion and chemical attack.

17. A corrosion resistant antifriction bearing assembly comprising:

a housing having a bearing seat for receiving a bearing insert; and a bearing insert disposed in the bearing seat, the bearing insert including an outer ring, an inner ring and a plurality of antifriction bearing elements disposed between the outer ring and the inner ring;

wherein at least one of the inner ring and the outer ring is a corrosion resistant ring, the corrosion resistant ring including a metal substrate, a galvanic protection layer disposed over at least a portion of the metal substrate, and a non-galvanic protective coating disposed over at least a portion of the galvanic protection layer; wherein the galvanic protection layer has a thickness of approximately 0.0003 inches and a nickel content of approximately 12 to 14%, and wherein the galvanic protection layer includes a porous zinc alloy plated to the portion of the metal substrate.

18. The bearing assembly of claim 17, wherein the corrosion resistant ring includes a bearing race configured to contact the plurality of bearing elements, and wherein the galvanic protection layer extends over at least a portion of the bearing race.

19. The bearing assembly of claim 18, wherein the non-galvanic protective coating extends over at least a portion of the bearing race.

20. The bearing assembly of claim 17, wherein the corrosion resistant ring includes a bearing race configured to contact the plurality of bearing elements, and wherein the galvanic protection layer does not extend over any portion of the bearing race, and wherein the non-galvanic protective coating extends over at least a portion of the bearing race.

21. The bearing assembly of claim 17, wherein the non-galvanic protective coating includes at least one polymer coating layer resistant to corrosion and chemical attack.

22. The bearing assembly of claim 21, wherein the at least one polymer coating layer comprises essentially a fluorocarbon polymer.

23. The bearing assembly of claim 21, wherein the non-galvanic protection layer further includes a clear chromate coating disposed between the galvanic protection layer and at least one polymer coating layer.

* * * * *